United States Patent
Yann et al.

(10) Patent No.: US 7,069,583 B2
(45) Date of Patent: Jun. 27, 2006

(54) DETECTION OF POLYMORPHIC VIRUS CODE USING DATAFLOW ANALYSIS

(75) Inventors: Trevor Yann, Rowville (AU); Oleg Petrovsky, Rego Park, NY (US)

(73) Assignee: Computer Associates Think, Inc., Islandia, NY (US)

( * ) Notice: Subject to any disclaimer, the term of this patent is extended or adjusted under 35 U.S.C. 154(b) by 616 days.

(21) Appl. No.: 09/905,341

(22) Filed: Jul. 14, 2001

(65) Prior Publication Data

US 2002/0078368 A1 Jun. 20, 2002

Related U.S. Application Data

(60) Provisional application No. 60/218,922, filed on Jul. 14, 2000.

(51) Int. Cl.
*H04L 9/00* (2006.01)
(52) U.S. Cl. .................................................. 726/4
(58) Field of Classification Search ............. 713/201, 713/188–189; 726/24; 714/38
See application file for complete search history.

(56) References Cited

U.S. PATENT DOCUMENTS

| | | | | |
|---|---|---|---|---|
| 5,826,013 A | * | 10/1998 | Nachenberg | ................ 713/200 |
| 5,964,889 A | * | 10/1999 | Nachenberg | .................. 714/25 |
| 6,357,008 B1 | * | 3/2002 | Nachenberg | .................. 726/24 |

* cited by examiner

*Primary Examiner*—Emmanuel L. Moise
*Assistant Examiner*—MinhDieu Nguyen
(74) *Attorney, Agent, or Firm*—Baker Botts L.L.P.

(57) ABSTRACT

A method and apparatus for detecting polymorphic viral code in a computer program is provided. The apparatus comprises an emulator, an operational code analyzer and an heuristic analyzer. The emulator emulates a selected number of instructions of the computer program. The operational code analyzer collects and stores information corresponding to operands and operators used in the instructions and the state of registers/flags after each emulated instruction execution. The heuristic analyzer determines a probability that the computer program contains viral code based on an heuristic analysis of register/flag state information supplied by the operational code analyzer.

29 Claims, 7 Drawing Sheets

DETECTION OF POLYMORPHIC VIRUS CODE USING DATAFLOW ANALYSIS

CROSS-REFERENCE TO RELATED APPLICATIONS

This application claims the benefit of co-pending provisional application Serial No. 60/218,922, filed Jul. 14, 2000 and entitled "DETECTION OF POLYMORPHIC VIRUS CODE USING DATAFLOW ANALYSIS."

TECHNICAL FIELD

The present disclosure relates to detection of computer viruses. More specifically, the disclosure relates to detection of polymorphic virus code using dataflow analysis.

DESCRIPTION OF THE RELATED ART

Computer viruses are a major problem in modern day computing. Generally, a computer virus is a computer program or some unit of computer executable code, e.g., instructions to which a computer responds, such as a code block, code element or code segment. When the viral code is executed on a computing device/system, it typically attaches to other programs or sets of computer instructions and/or replicates itself. In this way, the virus exists within and "infects" otherwise normal programs. Infected programs can exist anywhere in the computer system or even the operating system itself, and if not detected can cause potentially devastating problems.

The virus may spread from one computer file to another, and from one machine to another by attaching itself to a file or program in a removable storage medium, such as floppy disk, compact disc (CD), digital versatile disc (DVD), etc., that is accessible when the computer runs or accesses the infected file or program. If a user then places that infected medium into a second computer and the second computer runs or accesses the infected file or program, the virus will attempt to infect the second computer, and so forth. In addition, the virus may spread from one computing machine to another by attaching to data transmissions between the computer machines via a network or other transmission medium.

A file virus is a computer program that modifies other programs so that the next time the program modified by the virus is run the virus gains control over the execution flow. For example, the file virus may attach itself to a computer program ("subject program"). In order to be attached to the subject program, the virus may insert/append itself anywhere in a file that represents the program on a selected computer platform. Another method of infecting a program is by substituting a clean copy of the subject program with the file virus. In each of these examples, the virus gains control over execution flow of the infected program. When the infected program is executed the virus code may gain access to system resources to start propagating itself and perhaps performing other activities, for example, cause damage to an infected computer and/or information stored on the computer, prevent the computer from being used in its normal manner, etc.

Techniques for detecting computer viruses include (a) scanning suspected files for known virus signatures (templates), (b) emulating and heuristically analyzing the execution flow, and (c) a combination of the two. Finding virus signatures may be the most efficient method for detecting viruses in terms of speed. Unfortunately, searching for plain virus strings inside infected files are rarely successful now because of rapid developments within the art of computer virus creation over the past decade. In particular, creators of computer viruses now usually employ combinations of various obfuscation techniques to protect their viral code from anti-virus scanners.

Some common obfuscation techniques for viruses include virus code encryption, polymorphism in a decryptor of an encrypted virus, polymorphism in the plain (unencrypted virus code), slow polymorphic virus code in the plain (unencrypted virus code), and slow polymorphic virus decryptor code.

A virus code may be encrypted and then attached to a file in its encrypted form. The encryption technique may be polymorphic (for example, vary from one generation to another, so that the byte stream of each new viral infection is different from its predecessor). Each time the virus runs it will decrypt its own code in memory before control is transferred to it. Only a small portion of a virus code, which is known as a "decryptor", may be constant from one generation to another.

The decryptor may be generated by the virus code in such a way that it contains different code for each new generation of the virus. The decryptor's byte stream may be different for every new infection of the same virus. Under such circumstances, there are no constant byte streams that can be used for virus identification in an entire virus code span.

For some viruses, each new virus infection generates an unencrypted virus code different from its predecessor. Some other viruses generate new unencrypted code that is based on time rather than on the number of generations. Thus, the stream of bytes over the entire virus code remain constant over successive generations. In such instances, it is difficult to identify the virus as being polymorphic.

In other instances, a decryptor may appear as a constant code which changes only after a predetermined period of time or a predetermined number of new virus infections. The decryptor might not change at all for several generations of the virus. For such viruses, the code of the decryptor appears to be not polymorphic.

Polymorphism of a virus code may make it harder, and sometimes even nearly impossible, to use virus string detection to identify an infected file. Emulating a virus code is one of the possible solutions for detecting the virus. In such instances, when an emulator runs through a virus decryptor, the decryptor decrypts the virus code and then the code can be identified, via constant string matching, as containing a virus. If the virus decryptor is polymorphic, it usually consists of collections of instructions that are not used directly in the decryption process. In such instances, the emulator would have to emulate a larger amount of operational codes in order to decrypt an encrypted virus code.

The initial number of instructions for emulation is set at a level that allows decryption of encrypted viruses to identify the virus patterns. In practice, the amount of instructions needed to be emulated by the emulator to decrypt a polymorphic virus is quite large. The number of instructions set for decryption of a polymorphic viral code might create unnecessary performance overhead costs, if emulation is performed on files that are clean from viruses but are encrypted or look like they are encrypted, e.g., compressed files.

SUMMARY

The present disclosure provides a method of detecting polymorphic virus code in a computer program. In one embodiment, the method includes emulating a selected number of instructions of the computer program, collecting and storing information corresponding to a state of a plurality of registers/flags after each emulated instruction execution, and determining a probability that the computer program contains polymorphic viral code based on an heuristic analysis of the stored register/flag state information.

The present disclosure also provides an apparatus for detecting polymorphic virus code in a computer program. The apparatus includes, in accordance with one embodiment, an emulator, an operational code analyzer and an heuristic analyzer. The emulator emulates a selected number of instructions of the computer program. The operational code analyzer analyzes a plurality of registers/flags accessed during emulated execution of the instructions. The heuristic analyzer determines a probability that the computer program contains viral code based on an heuristic analysis of register/flag state information supplied by the operational code analyzer.

The emulator may emulate a second predetermined number of instructions (which is greater than the first predetermined number of instructions) if the probability determined by the heuristic analyzer is above a predetermined threshold. The second predetermined number of instructions may correspond to execution of a polymorphic decryptor.

The operational code analyzer may monitor the plurality of registers and/or flags for improper register/flag usage. The heuristic analyzer may maintain, for each of the plurality of registers and/or flags, a corresponding count of a number of times that the register/flag was improperly used during the emulated instructions. The operational code analyzer may monitor operand values of the emulated instructions. The operational code analyzer, according to one embodiment, detects when an operand value of an instruction which is set is not used by the instruction. The operational code analyzer also may detect when an undefined operand of an instruction is used by the instruction.

BRIEF DESCRIPTION OF THE DRAWINGS

The features of the present disclosure would be more readily understood from the following detailed description by referring to the accompanying drawings wherein.

DETAILED DESCRIPTION

The present disclosure provides tools for detecting polymorphic viral code in a computer program by emulating execution of a selected number of instructions of the computer program.

Figure 5:
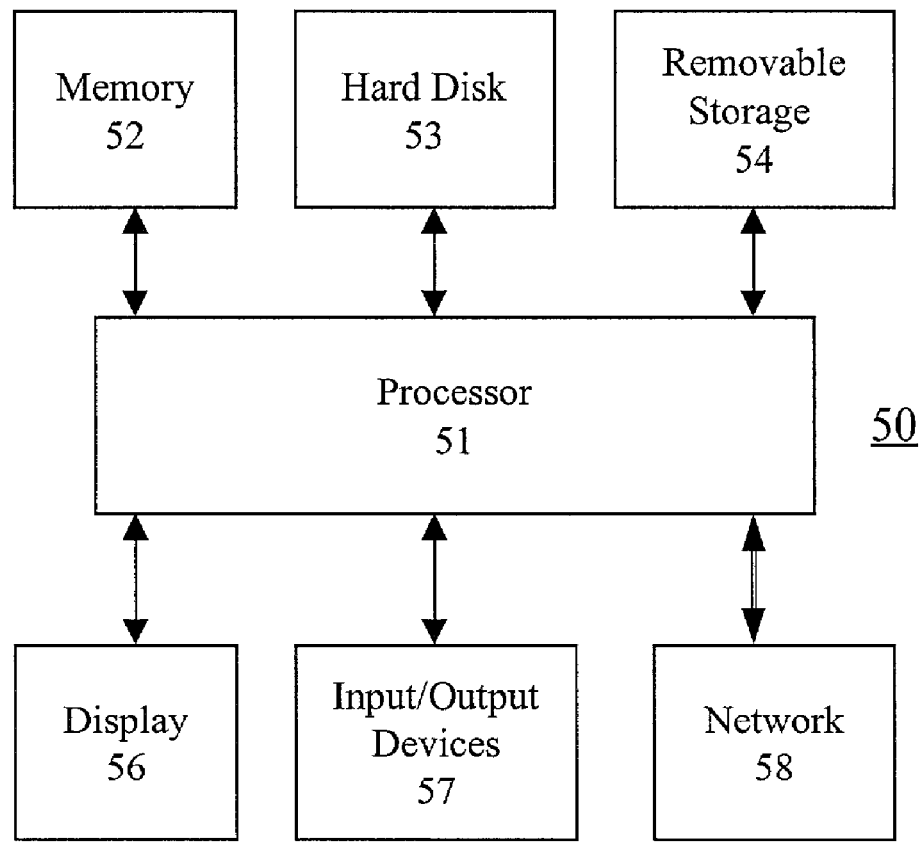
FIG. 5 shows a block diagram of a typical computing system/device that may be a target of a computer virus.

FIG. 5 illustrates a computer system or computer 50 on which the potentially infected program and other computer programs may execute and/or reside (and which thus may be a target of a virus). Computer system 50 comprises a processor 51, memory 52, hard disk 53, removable storage drive 54 (for reading/accessing removable storage media, such as floppy disks, CDs, DVDs, etc.), display 56, I/O devices 57 (for example, keyboard, mouse, microphone, speaker, etc.), and a wired or wireless connection to a network 58. The network can be, for example, a LAN, a WAN, an intranet, an extranet, the Internet, and/or any combinations of such networks. Computer 50 may be any of the computing devices/systems known in the art, such as, for example, a personal computer, a laptop, a workstation computer, a mainframe computer, a personal digital assistant (PDA), etc. (also referred to herein either separately or collectively as "computing device", "computer", "computer system" or "computing system").

A potentially infected program file may reside on/in, for example, hard disk 53 and/or a removable storage medium that may be read/accessed through removable storage drive 54. Also, the program file may be downloaded to the computer system or computer through network 58.

Figure 2:
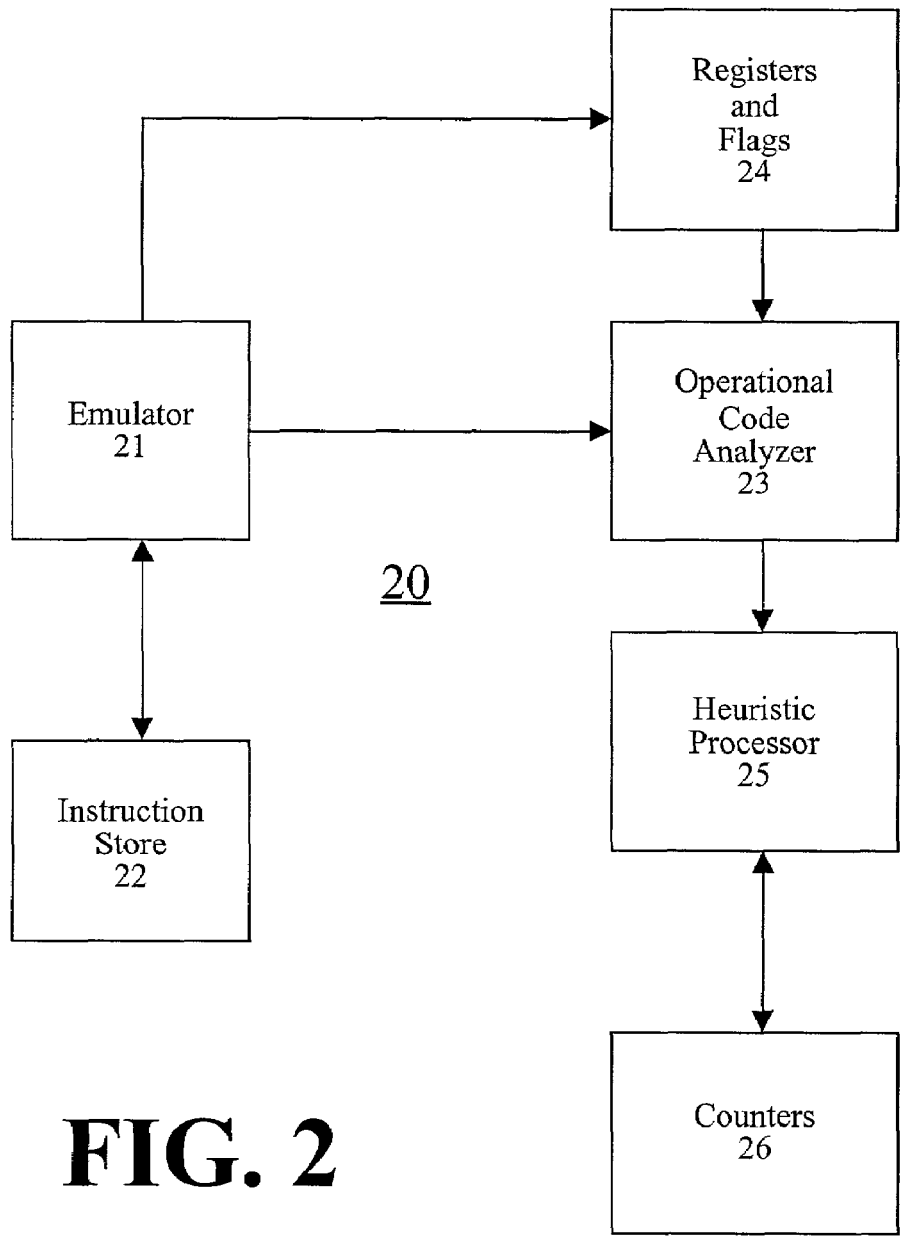
FIG. 2 shows a block diagram of an apparatus according to an embodiment of the disclosure for detecting a polymorphic viral code.
Figure 4:
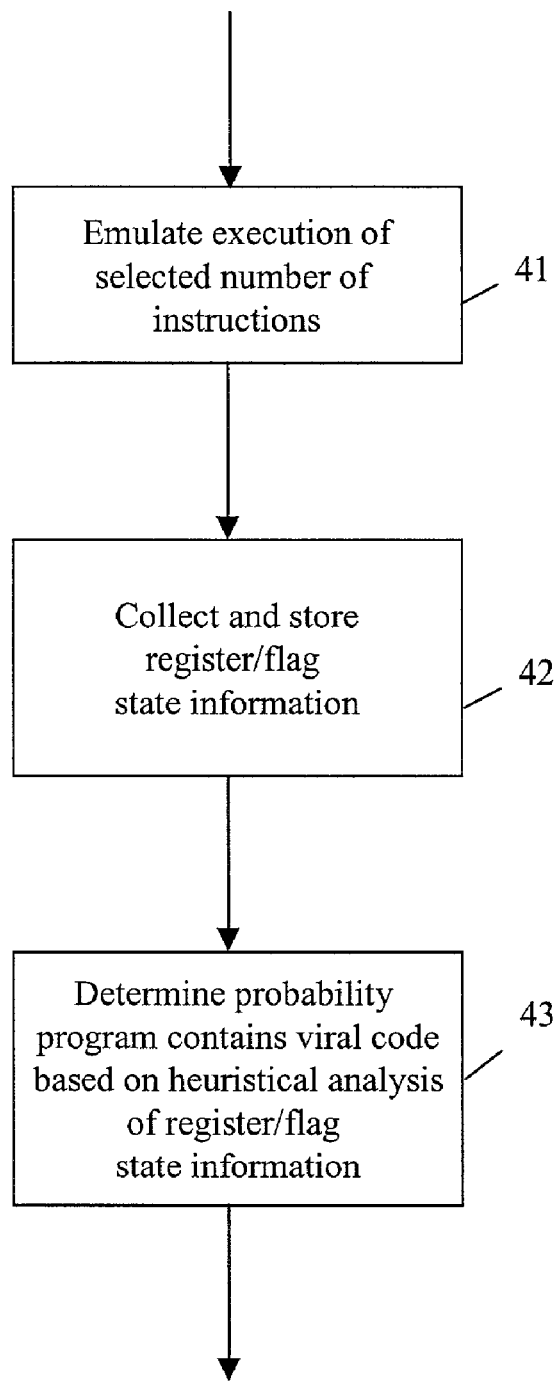
FIG. 4 shows a flow chart of a method according to another embodiment of the disclosure for detecting a polymorphic viral code.

A block diagram of an apparatus, in accordance with an embodiment of the present disclosure, for detecting polymorphic viral code in a computer program is shown in FIG. 2. Apparatus 20 comprises emulator 21, operational code analyzer 23 and heuristic analyzer 25. A method of detecting polymorphic viral code in a computer program, in accordance with one embodiment, will be described with reference to FIGS. 2 and 4. Emulator 21 emulates a selected number of instructions of the computer program (step 41). Information corresponding to a state of a plurality of registers/flags after each emulated instruction execution is collected by operational code analyzer 23 and supplied to heuristic analyzer 25 (step 42). Heuristic analyzer 25 determines a probability that the computer program contains viral code based on an heuristic analysis of the stored register/flag state information (step 43).

The present disclosure provides methods of detecting a polymorphic viral code at earlier stages of emulation. The operand and operator values of instructions emulated may be monitored. Special consideration may be given to unused values and those instances in which the operand/operator value is calculated without being defined. A plurality of these instances found during emulation may contribute to a determination that a polymorphic viral code is present. Once the suspect instances are identified, there is a higher probability that the code is viral or used by a virus decryptor. The emulator then is allowed to emulate a larger amount of instructions. Thus, emulation time is spent only on emulating code which has a high probability of containing a virus.

Figure 1:
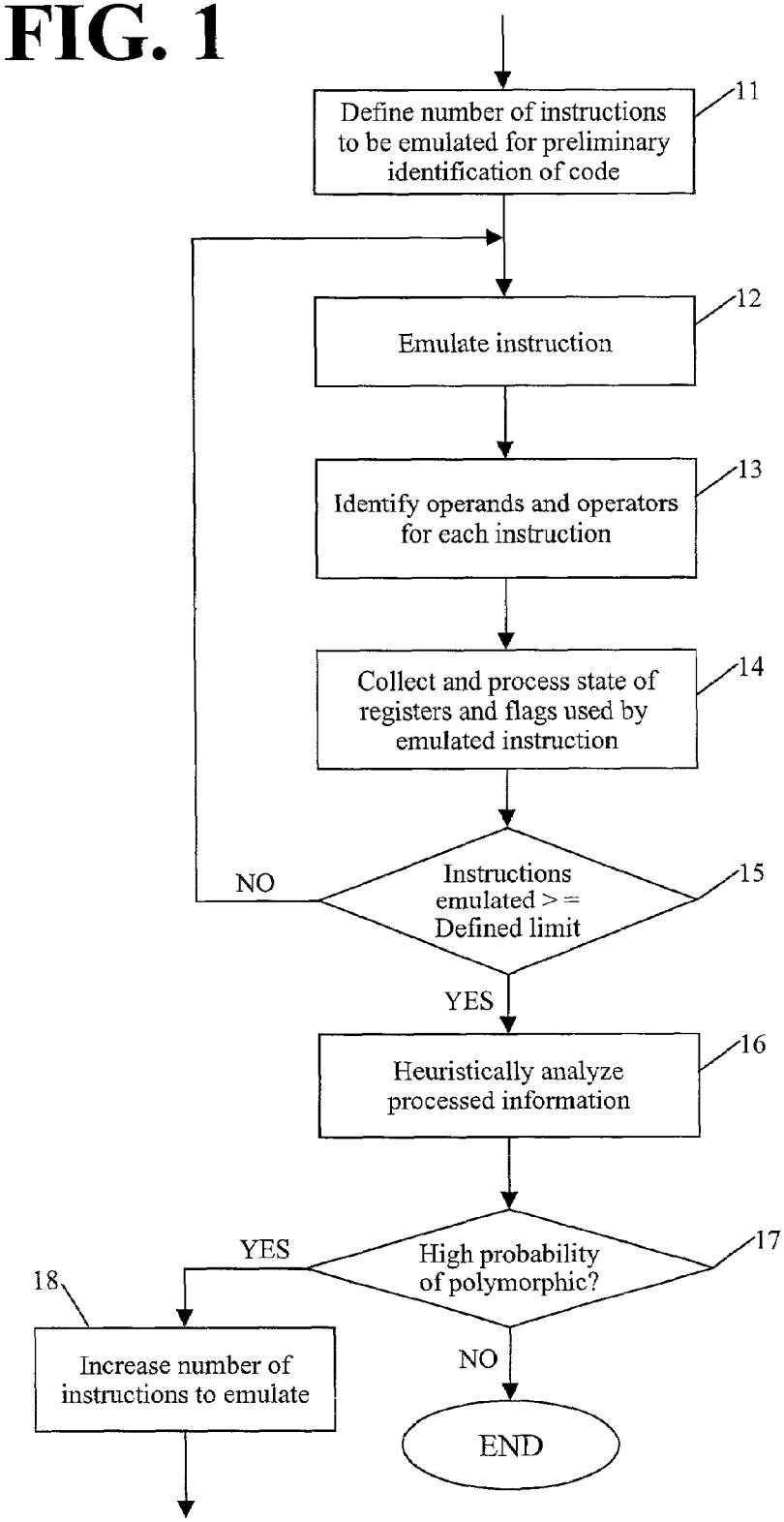
FIG. 1 shows a flow chart of a process according to an embodiment of the disclosure for detecting a polymorphic viral code.

A method, in accordance with one embodiment, for detecting polymorphic viral code in a computer program, will be described with reference to FIGS. 1 and 2. An amount of instructions to be emulated for preliminary identification of the code is defined (step 11). Instructions in the program are retrieved from instruction store 22 and emulated by emulator 21 one-by-one (step 12). For the emulated instruction, operands and operators that were involved in the emulated instruction execution are identified by operational code analyzer 23 (step 13). States of registers and flags 24 are collected (step 14) and processed, along with the operands and operators, for the emulated instruction. If it is determined (step 15) that the number of instructions emulated is less than the number of instructions defined in step 11, then steps 12-15 are repeated for the next instruction. If the number of instructions emulated is not less than the number of instructions defined in step 11, then the processed information collected in step 14 is heuristically analyzed by heuristic processor 25 in step 16. If it is determined (step 17) based on the heuristic analysis that there is a high probability that the code is polymorphic then the number of instructions to be emulated is increased (step 18) and emulation of the increased number of instructions to detect polymorphic viral code is performed.

The emulator retrieves the byte codes at a current instruction pointer position of the instruction store, and decodes and emulates the retrieved instruction. Once the instruction is emulated, the emulator passes control over to the operational code analyzer. The operational code analyzer extracts information about any operands and/or operators involved in the emulated execution of the instruction along with the state of CPU registers and flags. The operational code analyzer passes the gathered information to the heuristic processor. The heuristic processor collects and maintains data corresponding to each register/flag used by the emulated instruction. The heuristic processor may maintain counters 26 corresponding to respective registers/flags, with each counter keeping track of the number of times the corresponding register/flag triggered improper register usage state.

Figure 3:
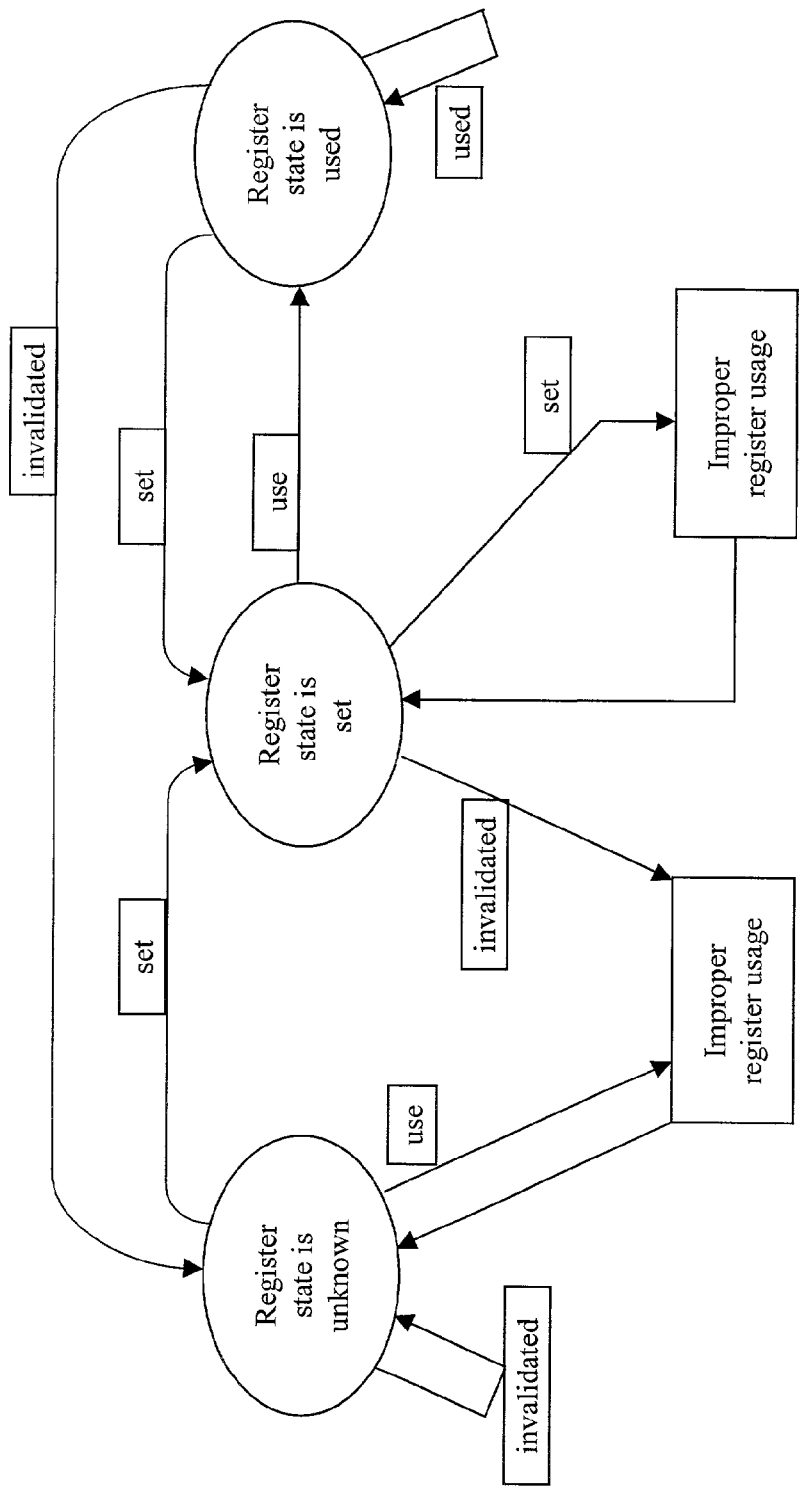
FIG. 3 shows a state diagram for determining improper register usage.

The conditions of the register/flag triggering an improper register usage state are shown in the state diagram in FIG. 3. During emulation of the program, a register/flag may be in one of the following three states: (a) undefined; (b) set; and (c) used. If a register/flag is loaded with an unknown value, its state is "undefined." Once the value that is loaded into a register/flag is known, the register/flag is in a "set" state. If a value in the register/flag is employed by a CPU instruction, the register/flag is in a "used" state.

Once the emulator has finished emulating the defined number of instructions set for identification of the program to be analyzed, the heuristic processor weighs the numbers collected for improper register/flag usage against the number of emulated instructions. The calculated numbers are compared with statistics representing average numbers of improperly used registers/flags for polymorphic and non-polymorphic viral code. The number of instructions to be emulated subsequently is based on identification of the emulated file as being polymorphic. If the file is identified to be polymorphic the number of instructions to be emulated is increased to cover execution of the polymorphic decryptor.

The apparatus and methods described above may be embodied in a computer program (or some unit of code) stored on/in computer readable medium, such as memory, hard drive or removable storage media. The apparatus and methods also may be in the form of a computer data signal, in one or more segments, embodied in a transmission medium, such as the Internet, an intranet, or another (wired or wireless) transmission medium. The present disclosure also encompasses, of course, execution of the computer program stored on/in a program storage device in a computing device/system, such as, for example, shown in FIG. 5.

The viral code detection methodologies described herein may be performed by a computer in one or a combination of the following circumstances. The viral code detection methodologies may be performed periodically (e.g., once/twice per day) or at selected times (e.g., each time the computer is powered up or restarted) by the computer on all relevant electronic files. In addition, the viral code detection methodologies may be performed on a file (or a data stream received by the computer through a network) before the file is stored/copied/executed/opened on the computer.

The specific embodiments described above are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

For example, the heuristic analyzer may be a rule-based module and/or adapted with other artificial intelligence techniques to determine whether the subject program likely contains polymorphic viral code (and therefore the number of instructions to be emulated should be increased to cover execution of the polymorphic decryptor). For example, the rule-based heuristic analyzer may include a learning component. When, after the heuristic analyzer has determined that the subject program likely contains polymorphic viral code, it is determined through additional emulation that the subject program contains polymorphic viral code, the positive identification of polymorphic viral code may be fed back to the learning component for fortifying the rules in the rule base and/or adding additional rules.

Further, while the heuristic analyzer in one embodiment is rule-based, it may be, in another embodiment, an intelligent network, such as a neural network.

Figure 6:
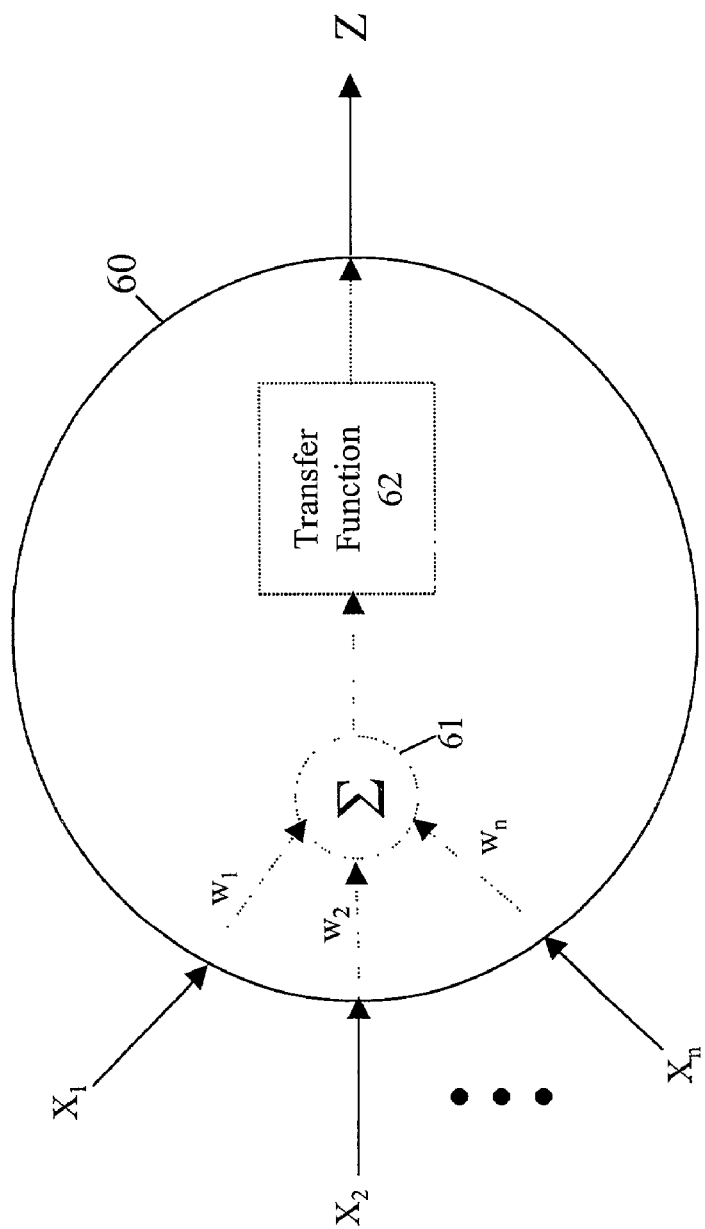
FIG. 6 shows a block diagram of a processing element which may be used in a neural network.

A neural network is an information processing modality which comprises a number of interconnected neuron-like processing elements that send data to each other along connections. FIG. 6 shows a diagram of a single processing element 60. The processing element receives inputs $X_1$, $X_2, \ldots X_n$), either from other processing elements or directly from inputs to the network. It multiplies each of its inputs by corresponding weights $w_1, w_2, \ldots w_n$ and adds the results together to form a weighted sum 61. It then applies a transfer function 62 (which is typically non-linear) to the weighted sum, to obtain a value Z known as the state of the element. The state Z is then either passed on to one or more other elements along weighted connections, or provided as an output signal. Collectively, states are used to represent information in the short term, while weights represent long-term information or learning.

Figure 7:
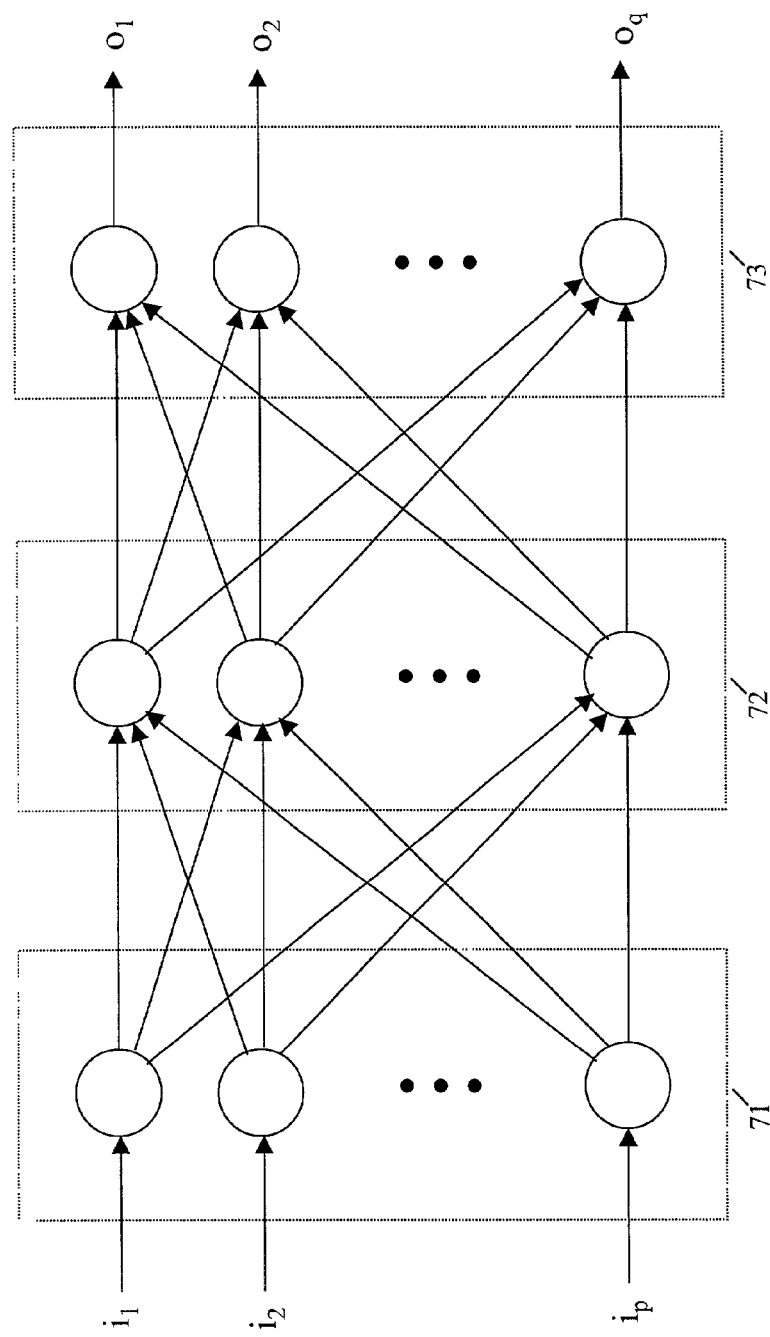
FIG. 7 shows a block diagram of a forward feeding, fully-connected, one hidden layer neural network.

Processing elements in a neural network typically are organized into layers: input layer processing elements (those which receive input data values); output layer processing elements (those which produce output values); and hidden layer processing elements (all others). Hidden layer processing elements allow the neural network to build intermediate representations that combine input data in ways that help the model to learn the desired mapping with greater accuracy. FIG. 7 shows a diagram illustrating the concept of hidden layer processing elements. Inputs $i_1, i_2, i_p$ are supplied to a layer of input processing elements 71. The outputs of the input elements are passed to a layer of hidden elements 72. Hidden layer elements pass outputs to a layer of output elements 73, and the output elements produce output values $o_1, o_2, \ldots o_q$. While the hidden layer processing elements are shown exemplarily in FIG. 7 as one layer of processing elements, neural networks may have multiple or no hidden layers.

Neural networks employ a technique of learning through repeated exposure to sample data and adjustment of the internal weights. The training process generally involves the following steps:

1) Repeatedly presenting examples of a particular input/output task to the neural network;
2) Comparing the network output and desired output to measure error; and
3) Modifying the weights to reduce the error.

This process is repeated until further iteration fails to decrease the error. Then, the network is said to be "trained."

Neural networks are able to capture nonlinearity and interactions among independent variables automatically without pre-specification. Training the neural network by applying specific, selected sample sets helps the network to develop quickly a general input-output model. Trained neural networks model the input-output relationship typically without requiring training with each and every possible set of inputs. Thus, neural networks are particularly suitable for, amongst other applications, pattern detection and recognition, even when a set of subject input values was not one of the samples used to train the network.

FIG. 7 shows a forward feeding, fully-connected, one hidden layer neural network which may be adapted to operate as an heuristic analyzer in an apparatus for detecting polymorphic viral code in a computer program. The network may be adapted to accept as its inputs the register/flag state information supplied by the operational code analyzer and to provide an estimate of the likelihood that the computer program contains polymorphic viral code. With appropriate selection of samples for training the network, the hidden layer processing elements in the trained network may correspond to the characteristic register/flag state changes associated with polymorphic viral code.

As one of ordinary skill in the art would recognize and understand, other networks may be used, alternatively. For a description of this and other neural networks, see, for example, David E. Rumelhart and James L. McClelland, Parallel Distributed Processing, Explorations in the Microstructure of Cognition, The MIT Press, Cambridge, Mass., U.S.A., 1986, and James L. McClelland and David E. Rumelhart, Explorations In Parallel Distributed Processing, A Handbook of Models, Programs, and Exercises, The MIT Press, Cambridge, Mass. 1988, the teachings of which are incorporated herein by reference.

Additional variations may be apparent to one of ordinary skill in the art from reading the following U.S. provisional applications, which are incorporated herein by reference:

(a) Ser. No. 60/218,488, filed Jul. 14, 2000 and entitled "DETECTION OF A CLASS OF MALICIOUS CODE";

(b) Ser. No. 60/218,333, filed Jul. 14, 2000 and entitled "DETECTION OF SUSPICIOUS PRIVILEGED ACCESS TO RESTRICTED COMPUTER RESOURCES";

(c) Ser. No. 60/218,926, filed Jul. 14, 2000 and entitled "DETECTION OF DECRYPTION TO IDENTIFY ENCRYPTED VIRUS";

(d) Ser. No. 60/218,922, filed Jul. 14, 2000 and entitled "DETECTION OF POLYMORPHIC VIRUS CODE USING DATAFLOW ANALYSIS";

(e) Ser. No. 60/218,467, filed Jul. 14, 2000 and entitled "DETECTION OF MALICIOUS CODE USING EMULATION OF OPERATING SYSTEM FUNCTIONS"; and (f) Ser. No. 60/218,313, filed Jul. 14, 2000 and entitled "DETECTION OF POLYMORPHIC SCRIPT LANGUAGE VIRUSES BY DATA DRIVEN LEXICAL ANALYSIS".

What is claimed is:

1. A method of detecting polymorphic viral code comprising:
    emulating a first predetermined number of instructions of a computer program;
    detecting at least one unused or misused operand or operator of the first predetermined number of instructions, wherein detecting at least one unused or misused operand or operator comprises identifying at least one operand or operator that is not used during emulation of the first predetermined number of instructions;
    collecting information after emulating at least one instruction, wherein at least a portion of the collected information corresponds to a plurality of registers and/or flags and to the at least one detected unused or misused operand or operator; and
    determining a probability that the computer program contains polymorphic viral code based at least in part on an heuristic analysis of the collected information.

2. The method of claim 1, further comprising emulating additional instructions if the determined probability is above a predetermined threshold.

3. The method of claim 2, wherein the additional instructions correspond to execution of a polymorphic decryptor.

4. The method of claim 2, wherein the additional instructions are more than the first predetermined number of instructions.

5. The method of claim 1, further comprising detecting improper use of at least one of the plurality of registers and/or flags.

6. The method of claim 5, further comprising determining, for each of the plurality of registers and/or flags, a number of times that the register and/or flag was improperly used during the emulation of the first predetermined number of instructions.

7. The method of claim 6, wherein the heuristic analysis comprises comparing the number of times that the register and/or flag was improperly used with the first predetermined number of instructions.

8. The method of claim 6, wherein the heuristic analysis comprises comparing the number of time that the register and/or flag was improperly used with statistics corresponding to a plurality of polymorphic viral codes.

9. The method of claim 1, further comprising:
identifying a polymorphic viral code associated with the computer program; and
generating or modifying at least one rule based at least in part on the identification of the polymorphic viral code.

10. The method of claim 1, wherein the heuristic analysis is performed using at least one neural network.

11. The method of claim 1, wherein the determined probability is based at least in part on the identification of the at least one unused operand or operator.

12. A method of detecting polymorphic viral code, comprising:
emulating a first predetermined number of instructions of a computer program;
detecting at least one unused or misused operand or operator of the first predetermined number of instructions, wherein detecting at least one unused or misused operand or operator comprises identifying at least one undefined operand or operator used during emulation of the first predetermined number of instructions;
collecting information after emulating at least one instruction, wherein at least a portion of the collected information corresponds to a plurality of registers and/or flags and to the at least one detected unused or misused operand or operator; and
determining a probability that the computer program contains polymorphic viral code based at least in part on an heuristic analysis of the collected information.

13. The method of claim 12, wherein the determined probability is based at least in part on the identification of the at least one undefined operand or operator.

14. A program storage device readable by a machine, tangibly embodying a program of instructions executable by the machine to perform a method for detecting polymorphic viral code in a subject computer program, the method comprising:
emulating a selected number of instructions of the computer program;
detecting at least one unused or misused operand or operator of the selected number of instructions, wherein detecting at least one unused or misused operand or operator comprises identifying at least one operand or operator that is not used during emulation of the selected number of instructions;
collecting information after emulating at least one instruction, wherein at least a portion of the collected information corresponds to a plurality of registers and/or flags and to the at least one detected unused or misused operand or operator; and
determining a probability that the computer program contains polymorphic viral code based at least in part on an heuristic analysis of the collected information.

15. A system for detecting polymorphic viral code, comprising:
a processor; and
a program storage device readable by the system, tangibly embodying a program of instructions executable by the processor to perform a method for detecting a polymorphic viral code in a computer program, the method comprising:
emulating a selected number of instructions of the computer program;
detecting at least one unused or misused operand or operator of the selected number of instructions, wherein detecting at least one unused or misused operand or operator comprises identifying at least one undefined operand or operator used during emulation of the selected number of instructions;
collecting and storing information after emulating at least one instruction, wherein at least a portion of the collected information corresponds to a plurality of registers and/or flags and to the at least one detected unused or misused operand or operator; and
determining a probability that the computer program contains polymorphic viral code based at least in part on an heuristic analysis of the collected information.

16. A computer data signal embodied in a transmission medium, the computer data signal embodying instructions executable by a computer to detect polymorphic viral code in a computer program the computer data signal comprising:
a first segment including emulator code to emulate a selected number of instructions of the computer program;
a second segment including detection code to detect at least one unused or misused operand or operator of the selected number of instructions, wherein detecting at least one unused or misused operand or operator comprises identifying at least one operand or operator that is not used during emulation of the selected number of instructions;
a third segment including analyzer code to analyze a plurality of registers and/or flags accessed during emulation of at least one instruction; and
a fourth segment including heuristic processor code to determine a probability that the computer program contains polymorphic viral code based at least in part on an heuristic analysis of the plurality of registers and/or flags and the at least one detected unused or misused operand or operator.

17. An apparatus for detecting polymorphic viral code, comprising:
an emulator operable to emulate a first predetermined number of instructions of a computer program;
an operational code analyzer operable to:
detect at least one unused or misused operand or operator of the first predetermined number of instructions, wherein detecting at least one unused or misused operand or operator comprises identifying at least one undefined operand or operator used during emulation of the first predetermined number of instructions; and
analyze a plurality of registers and/or flags accessed during emulation of at least one instruction;
and
an heuristic analyzer operable to determine a probability that the computer program contains polymorphic viral code based at least in part on an heuristic analysis of the plurality of registers and/or flags and the at least one detected unused or misused operand or operator.

18. The apparatus of claim 17, wherein the emulator is operable to emulates additional instructions if the determined probability is above a predetermined threshold.

19. The apparatus of claim 18, wherein the additional instructions correspond to execution of a polymorphic decryptor.

20. The apparatus of claim 18, wherein the additional instructions are more than the first predetermined number of instructions.

21. The apparatus of claim 17, wherein the operational code analyzer is operable to detect improper use of at least one of the plurality of registers and/or flags.

22. The apparatus of claim 21, wherein the heuristic analyzer determines, for each of the plurality of registers and/or flags, a number of times that the register and/or flag was improperly used during the emulation of the first predetermined number of instructions.

23. The method of claim 22, wherein the heuristic analysis comprises comparing the number of times that the register and/or flag was improperly used with the first predetermined number of instructions.

24. The method of claim 22, wherein the heuristic analysis comprises comparing the number of times that the register and/or flag was improperly used with statistics corresponding to a plurality of polymorphic viral codes.

25. The apparatus of claim 17, wherein at least one of the emulator, operational code analyzer, or heuristic analyzer is further operable to:
    identify a polymorphic viral code associated with the computer program; and
    generate or modify at least one rule based on at least in part on the identification of the polymorphic viral code.

26. The apparatus of claim 17, wherein the heuristic analysis is performed using at least one neural network.

27. The method of claim 17, wherein the determined probability is based at least in part on the identification of the at least one undefined operand or operator.

28. An apparatus for detecting polymorphic viral code, comprising:
    an emulator operable to emulate a first predetermined number of instructions of a computer program;
    an operational code analyzer operable to:
        detect at least one unused or misused operand or operator of the first predetermined number of instructions, wherein detecting at least one unused or misused operand or operator comprises identifying at least one operand or operator that is not used during emulation of the first predetermined number of instructions; and
        analyze a plurality of registers and/or flags accessed during emulation of at least one instruction;
    and
    an heuristic analyzer operable to determine a probability that the computer program contains polymorphic viral code based at least in part on an heuristic analysis of the plurality of registers and/or flags and the at least one detected unused or misused operand or operator.

29. The method of claim 22, wherein the determined probability is based at least in part on the identification of the at least one unused operand or operator.

* * * * *